United States Patent [19]
Akers

[11] Patent Number: 5,214,258
[45] Date of Patent: May 25, 1993

[54] APPARATUS AND METHOD OF ULTRA RAPID ANNEALING BY INDUCTION HEATING OF THIN STEEL STRIP

[75] Inventor: Ronald R. Akers, Bloomfield Hills, Mich.

[73] Assignee: Tocco, Inc., Boaz, Ala.

[21] Appl. No.: 649,693

[22] Filed: Feb. 1, 1991

[51] Int. Cl.$^5$ .............................................. H05B 6/08
[52] U.S. Cl. ........................... 219/10.77; 219/10.61 R
[58] Field of Search ..................... 219/10.77, 10.61 R, 219/10.57, 10.41, 10.43, 10.75

[56] References Cited

U.S. PATENT DOCUMENTS

| | | | |
|---|---|---|---|
| 2,381,057 | 8/1945 | Hutcheson | 219/10.77 |
| 2,453,529 | 11/1948 | Mittelmann | 219/10.77 |
| 2,623,176 | 12/1952 | Witsenburg et al. | 219/10.77 |
| 2,724,037 | 11/1955 | Bock | 219/10.77 |
| 3,064,109 | 11/1962 | Peschel | 219/10.77 |
| 3,441,876 | 4/1969 | Zwanenburg | 219/10.77 |

Primary Examiner—Philip H. Leung
Attorney, Agent, or Firm—Body, Vickers & Daniels

[57] ABSTRACT

An induction heating apparatus and method for ultra rapid annealing of a ferromagnetic strip moving at a selected velocity along a given path. The apparatus and method uses a vacuum tube R.F. oscillator having a D.C. input power supply providing D.C. voltage and D.C. current to the oscillator, a grid, a radio frequency output, and a grid feedback circuit for driving the grid. An induction heating coil surrounds the strip, and a known length along the path. A parallel capacitor bank forms the coil into a main tank circuit with a resonant frequency. Means are provided for sensing the voltage of the induction heating coil and for adjusting said D.C. voltage of the input power supply in accordance with said sensed coil voltage to maintain the power density in the strip at a selected level as the strip passes through the coil to raise the temperature of the moving strip at a rate sufficiently high to exceed the Curie point temperature of the moving strip.

63 Claims, 9 Drawing Sheets

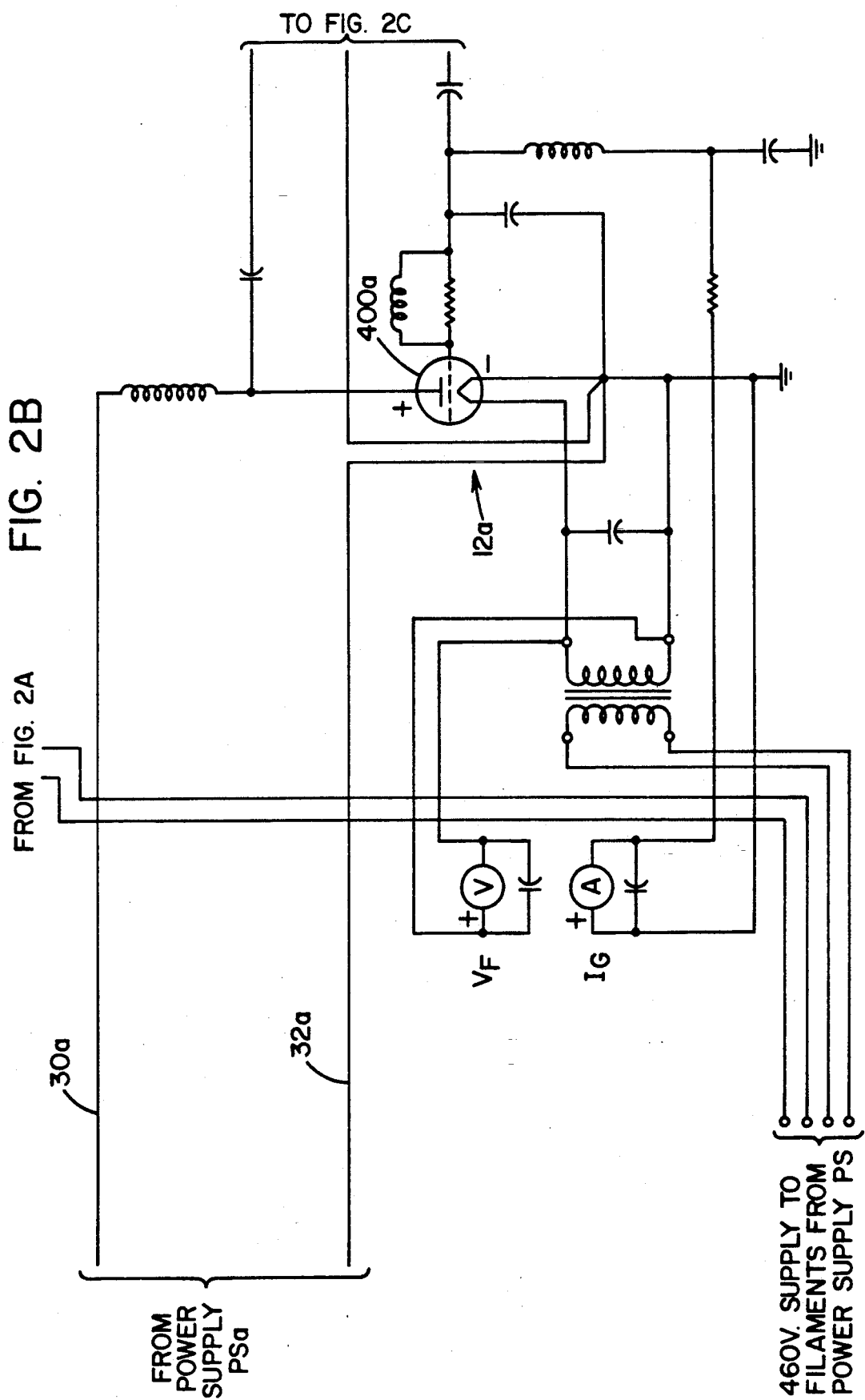

a = 28 inches
b = 47 inches
c = 8 inches

APPARATUS AND METHOD OF ULTRA RAPID ANNEALING BY INDUCTION HEATING OF THIN STEEL STRIP

This invention relates to the art of annealing a moving strip and more particularly an apparatus and method for ultra rapid annealing (URA) of a thin steel strip as it is moving rapidly along a selected path.

The invention is particularly applicable for ultra rapid annealing for grain refinement of a thin sheet metal steel strip. This type of strip is a silicon steel with grain orientation and has a thickness in the general range of 0.007–0.0015. To accomplish grain refinement of such thin strips, ultra rapid annealing must be accomplished, which procedure requires that the temperature of the moving strip is raised at a sufficiently high rate as the strip is being continuously heated. This rate causes the strip to increase in temperature to the processing temperature above the Curie point temperature in a short time determined by the strip speed. Thereafter, normal air cooling of the strip allows it to be annealed to the desired physical characteristics. It has been suggested that rapid heating of thin metal strip must be accomplished by fossil fuel furnaces. Such ultra rapid heating of thin strip has heretofore been generally considered to be unattainable in a continuous induction heating apparatus and by using an induction heating method which did not have substantial power losses. The steel strip is ferromagnetic and has a Curie point temperature in the general range of 1250° F. Heretofore, such steel could not be rapidly annealed in accordance with the parameters set forth above.

By using the present invention, a radio frequency power tube oscillator having an output of at least about 500–600 KW is employed for the purpose of driving an induction heating coil in a manner to accomplish ultra rapid annealing of the moving strip. To accomplish this objective, the present invention involves several unique features which have been combined to accomplish the desired objective of a radio frequency vacuum tube oscillator driving an induction heating coil to ultra rapidly anneal a rapidly moving, thin steel strip. In accordance with one aspect of the invention, the strip is preheated to a temperature of at least about 600° F. before being passed into the induction heating coil. This preheating reduces the energy necessary for driving the induction heating coil and is accomplished by a gas fired furnace or other appropriate furnace located upstream of the induction heating coil used for the critical final heating of the moving strip. The high preheat temperature tends to reduce the fines and avoids oil and other contamination on the strip as it is being passed into the induction heating coil. In the preferred embodiment, only a single turn coil is employed and a voltage of approximately 2500–5000 volts is applied across the coil from the main output tank circuit. In accordance with an aspect of the invention which will be explained later, the main tank circuit for the induction heating coil includes a network of capacitors which are mounted directly adjacent, i.e. at the induction heating coil. To drive the grid circuit of the vacuum tube forming the radio frequency oscillator, the present invention employs an isolation transformer having a primary winding which is part of the tank circuit for the induction heating coil. The secondary winding of the isolation transformer is then formed as a part of the feedback drive circuit for the grid which is operated in Class C.

In this manner, the driving circuit for the grid is provided with a natural frequency different than the natural frequency of the tank circuit forming the output of the radio frequency oscillator. Since the feedback grid drive circuit is decoupled from the tank circuit, it can be tuned either above or below the output frequency of the main output tank circuit of the radio frequency oscillator so that the vacuum tube oscillator will not be overloaded when the grid circuit is driven to its maximum both in D.C. bias and in feedback to maximize the output voltage of the oscillator. By this decoupling of the feedback grid circuit from the power or main tank circuit, the grid of the power tube forming the radio frequency oscillator can be driven at the maximum current and maximum D.C. bias to maximize the voltage output to the tank circuit driving the induction heating coil. Only in this manner can a high power vacuum tube radio frequency oscillator drive a tank circuit including the induction heating coil at an efficiency to create a voltage which will generate a sufficient flux density in the strip, as it passes through the coil, to raise the temperature of the moving strip at a rate of at least about 500° F./sec while the strip is moving through at a speed of at least about 150 ft/min and preferably above 160 ft/min. In this manner, ultra rapid annealing (URA) is accomplished by the present invention. A rapidly moving strip with a high power density created in the strip by the high voltage driven induction heating coil accomplishes the ultra rapid annealing of the strip. Thus, the present invention creates an apparatus and method for accomplishing ultra rapid annealing of a thin metal strip by a radio frequency vacuum tube oscillator by providing an isolated feedback grid circuit, which circuit is detuned so that the tube can be driven to the maximum levels without overloading the vacuum tube itself. In accordance with the preferred embodiment, the natural frequency of the grid drive circuit, or tank circuit, for the grid is greater than the resonant frequency of the main output tank circuit which includes the induction heating coil. Preferably, the induction heating tank circuit has a frequency of greater than about 400 KHz, but less than 500 KHz, and is preferably in the general range of 435 KHz. The resonant frequency of the feedback drive circuit for the grid of the oscillator has a natural frequency in excess of about 500 KHz and is preferably about 510 KHz. By having this difference in the natural frequencies of the two tank circuits, the detuned and decoupled grid circuit can be, and is, driven at its maximum parameters. This protects the grid so that it will not overload the tube even when the output voltage for the coil is in the general range of 2500–5000 volts which is required to assure continued URA. The natural frequency of the tank circuit driving the induction heating coil does not include an output transformer to connect the coil with the output of the radio frequency oscillator. Thus, the oscillator is directly coupled to the output tank circuit, which circuit is formed by the capacitors located adjacent, or at, the actual heating location of the induction heating coil. By using this direct coupling of the coil and the oscillator and the isolation concept to detune and decouple the grid circuit, the grid can be driven exactly where the grid should be driven to give its maximum performance. This aspect of the invention allows the desired results heretofore believed to be unattainable. The feedback A.C. volt signal to the grid is superimposed upon a D.C. biasing voltage which is also set at a maximum level for the power tube to provide the maximum amount of current flow for a class C operation of the radio frequency oscillator.

To accomplish ultra rapid annealing of moving steel strip by using a radio frequency vacuum tuned oscillator driving an induction heating coil, the present invention employs a unique control concept wherein the voltage of the coil itself is employed for driving the vacuum tube of the radio frequency oscillator. Only in this manner can the ultra rapid annealing be maintained as the moving strip changes in thickness and in prior treatment. Controlling a radio frequency oscillator by the coil voltage of an induction heating coil has been heretofore considered unattainable and existing techniques attempt to use D.C. voltage or current for control. The existing techniques are very limited and overload the tube as the parameters of the heating installation vary. In accordance with another aspect of the invention, the coil voltage control system is accomplished by driving the oscillator to its maximum level and employing a second stage control function wherein the input current to the vacuum tube oscillator is employed for controlling the oscillator when the coil voltage control mode seeks additional input D.C. current, which current is not available from the D.C. power supply driving the vacuum tube oscillator. When this current deficiency occurs, the control system of the present invention shifts into a current control mode. Thus, at the start of the strip heating operation for a given run, input D.C. current is employed for driving the induction heating coil to its maximum level attainable by maximum input D.C. current. Thereafter, as the permeability of the strip decreases due to its shift into ultra rapid annealing, which is accomplished by the strip passing through the Curie point temperature, the control concept of the present invention shifts the control of the input power supply to the voltage of the coil. Whenever the Curie point temperature is not obtained in subsequent operation of a given strip heating run, the present invention shifts the control of the input power supply from the coil voltage to the input D.C. current. This ability to shift between coil voltage control and D.C. current control as the strip shifts between ultra rapid annealing and non-ultra rapid annealing, allows the proper operation of the apparatus in a controlled manner.

In this manner, the strip can be heated by power density providing over 500° F./sec heating of a thin metal strip moving at a rate of over 100 ft/min. The voltage across the coil employed for the induction heating determines the distribution of the power and, thus, the power density to which the strip is exposed as it passes through the heating coil. This power density is readable as coil voltage since the coil dimensions are fixed. In the start up of the apparatus and method of the present invention, the coil voltage reaches 2,000 volts, which voltage is the maximum voltage which can be obtained with about 10K volts D.C. input with about 60 D.C. amperes of current input to the plate circuit of the vacuum tube oscillator. After the Curie point of the moving strip has been reached, the control process shifts into the ultra rapid annealing condition which allows the coil to be shifted to 2500-3300 volts and shifts the control mode into the coil voltage control of the input power supply for the vacuum tube oscillator. By using the invention the strip temperature can be maintained at even a higher coil voltage, i.e. 4800-5000 volts. Thus, coil voltage is employed for controlling an R.F. tube oscillator for driving an induction heating installation, a concept heretofore believed to be impossible. In this manner, ultra rapid annealing can be accomplished and controlled by the coil voltage itself as ultra rapid annealing is maintained in a production run of a given strip. Whenever ultra rapid annealing does not occur due to variations in the moving strip, D.C. current demands increase and the present invention allows the control of the oscillator to be shifted to an input D.C. current control mode until ultra rapid annealing is again accomplished. This condition is sensed by the voltage increasing while the current demands decrease.

Although the invention can be employed for metal strip in the range of 0.0045-0.0280, i.e. "thin strip", the preferred thickness of the steel strip processed by the present invention is 0.007-0.014 which is referred to as "very thin strip". At the end of the strip, the thickness of the strip normally increases; therefore, in accordance with an aspect of the invention, the coil voltage feedback can not create sufficient current without overloading the tube; therefore, the control is transferred back into the D.C. current control mode as previously described. In the past, attempts to ultra rapid anneal a moving strip by induction heating or otherwise, produced a substantial amount of scrap. As the strip varied, it shifted out of ultra rapid annealing. This shift out of URA could last for a major portion of the strip of a given strip reel. This shift into non-URA for long periods was particularly disadvantageous when the strip had a tendency to change in thickness because of variable prior rolling operations. The present invention, by using coil voltage feedback control, anticipates and adjusts the oscillator for changes in thickness of the moving strip. This use of a coil voltage control drastically reduces the amount of scrap. Thus, by employing the concept of measuring the coil voltage to control the D.C. voltage input it has been found that a substantial tracking of the strip is accomplished so that the strip continues to be ultra rapid annealed even though the strip varies in thickness and prior treatment.

Control of an R.F. vacuum tube oscillator used in induction heating by coil voltage feedback is new. Another feature of the present invention which is also independently new is the preheating of the strip to about 600°-700° F. to remove fines and other impurities on the moving strip before the strip enters the coil. This concept assists in the dependability of the induction heating process accomplished in the apparatus constructed in accordance with the present invention.

By utilizing the present invention, the power density in the moving strip can be controlled by the coil voltage feedback control mode, since the heating coil has a fixed length and the velocity of the moving strip is set in advance. The ultra rapid annealing operation is separated from the non-rapid annealing operation by a transition through the Curie point temperature. Thus, the amount of current required to maintain a preselected power density or coil voltage will be indicative of the annealing operation taking place in the strip. As the current demand increases beyond the capabilities of the power supply, then the process is shifted into a current control mode. In this manner, whenever the strip tends to drift from ultra rapid annealing, D.C. current control takes over and allows the system to maintain control of the oscillator until ultra rapid annealing is again established. Thus, the coil voltage feedback control allows compensation for various thicknesses, preheat temperatures and line speeds. The back up D.C. current control mode protects the oscillator during drastic shifts through the Curie point and maintains strip temperature. The oscillator in accordance with the present invention has over 500 KW output and the voltage of the coil can be maintained over 2500 volts and can be maintained in the preferable range of 2500-5000 volts. At about 2500 volts on the heating coil, the power density at the strip allows the moving strip to shift into and out of ultra rapid annealing; therefore, it is preferable to maintain a voltage greater than 2500 volts. This actual temperature depends upon strip thickness and other parameters. Voltage control in the high range of 4800-5000 is obtainable.

In accordance with an aspect of the invention which will be described later, the shift between coil voltage feedback control and input D.C. current feedback control is determined by a process logic controller including a selector circuit which determines the deviation of the input D.C. current from a selected current set point and the deviation of the sensed, instantaneous coil voltage from a preselected voltage set point. The selector network or circuit of the process logic controller shifts the mode of operation to the feedback circuit which is closest to its preselected set point. Thus, if the input current is closer to its set point than the set point for the coil voltage, current control will be employed. This is a temporary mode of operation which does not produce the accuracy obtainable by the coil voltage feedback circuit which determines exactly the power density being introduced into the strip as the control parameter. The actual voltage of the coil is controlled by adjusting the output power from the oscillator to the coil. Thus, whenever the voltage coil feedback mode of operation is employed, accuracy is drastically increased. In accordance with another feature of the control concept of the invention, the deviation signal between the voltage set point and the instantaneous sensed coil voltage can be adjusted between 22% and 40% of its normal value. This then deemphasizes the deviation signal from the coil voltage feedback circuit over the input current feedback circuit. This deemphasis is held for a minimum time which is approximately 10-20 seconds. Thereafter, the deviation signal from the input current feedback has the same scale as the coil voltage feedback.

The invention employs PID circuits for creating the deviation signals. These PID networks or circuits are well known. They sum a signal proportional to the error, with a signal proportional to the integral of the error and with a signal proportional to the derivative of the error. The integration of the error compensates for a slow, long term, drift from the set point. The derivative signal compensates for rapid excursions away from the set point. Thus, the use of PID systems or networks for creating the deviation signals merely allows for uniform and accurate feedback operation and error correction of the input power supply.

STATEMENT OF INVENTION

In accordance with the present invention there is provided an induction heating apparatus for ultra rapid annealing of a ferromagnetic strip having a thickness of 0.0045-0.0280 inches and moving at a selected velocity above 100 ft/min, but preferably above 150 ft/min, along a given path. This apparatus comprises a vacuum tube R.F. oscillator having a D.C. input power supply providing D.C. voltage and D.C. current to the oscillator. The vacuum tube oscillator includes a grid, a radio frequency output in the general range of over 400 KHz and a grid feedback circuit for driving the grid in Class C. An induction heating coil is provided around the moving strip with the induction heating coil having a known length along the path and a parallel capacitor bank forming the induction heating coil into a tank circuit with a resonant frequency. There are provided means for moving the strip into and through the induction heating coil at the selected velocity, means for sensing the coil voltage of the induction heating coil and means for adjusting the D.C. voltage of the input power supply in accordance with the sensed coil voltage to maintain the voltage of the coil at a preselected set point level as the strip passes through the coil. In this manner, the desired power density in the strip is maintained. By adjusting the strip velocity to a high level, this power density raises the temperature of the moving strip at a rate of at least over 500° F. per second. By preheating the strip to a temperature of at least 600° F.-700° F., the power density maintains ultra rapid annealing of the rapidly moving strip. The rate of heating brings the strip above the Curie point temperature as it moves through the induction heating coil and may be substantially greater than 500° F./sec.

In accordance with another aspect of the invention, there is provided an isolation transformer adjacent the induction heating coil with a primary winding in parallel with the tank circuit of the coil and a secondary winding. There is provided means for energizing the grid feedback circuit by the secondary winding of the isolation transformer. In this manner, the feedback circuit can have a resonant frequency determined by its own parameters. The grid circuit is decoupled and detuned from the output tank circuit. In accordance with this aspect of the invention, the feedback circuit has a resonant frequency different from the resonant frequency of the output tank circuit so that there is a detuning and isolation of the grid drive circuit. In this fashion, the grid can be driven to provide maximum output voltage of the oscillator without affecting the frequency of the output circuit.

In accordance with another aspect of the present invention there is provided a method for ultra rapid annealing a textured steel strip with grain orientation and having a thickness in the range of 0.005-0.028 inches moving at a selected velocity above about 100 ft/min, preferably 150 ft/min, along a given path. This method comprises the steps of preheating the strip to a temperature in excess of about 600° F.; providing a vacuum tube R.F. oscillator having a D.C. input power supply producing a D.C. voltage and a D.C. current to the oscillator, a grid, a radio frequency output with a frequency exceeding about 400 KHz and a grid feedback circuit for driving the grid; inductively heating the moving strip at a frequency of over 400 KHz and at a power greater than about 600 KW with an induction heating coil having a known length extending along the path and a parallel capacitor bank forming the heating coil into a main tank circuit with a resonant frequency matching the output frequency of the oscillator; driving the induction heating coil with the vacuum tube oscillator; sensing the voltage of the induction heating coil; establishing a coil voltage value or set point to create a power density in the strip as the strip passes through the coil to raise the temperature of the moving strip at a rate of at least about 1000° F./sec; comparing the sensed voltage to the voltage value or voltage set point to create a deviation signal; and, adjusting the D.C. voltage to the plate circuit of the oscillator tube in accordance with the deviation signal.

In both the apparatus and method, a single vacuum tube may not have sufficient output power reserve; therefore, a slave tube can be connected in parallel with the above-mentioned power tube to operate in the method and apparatus of the invention. When oscillator or tube is used in the disclosure such tandem arrangement is included.

In accordance with another aspect of this method, there is provided the additional steps of sensing the D.C. input current; comparing the sensed D.C. input current with a current set point or desired current level to create a current deviation signal; and, controlling the input power supply by the lesser of the voltage deviation signal or the current deviation signal. In this manner, normal ultra rapid annealing is accomplished with coil voltage feedback. Under unusual circumstances, or at the start of the heating cycle, current feedback is employed to control the oscillator. This current control mode is a back up mode of operation that allows shifting between ultra rapid annealing and non-ultra rapid annealing without causing substantial scrap in the process. In the past, long term non-URA operation resulted because of lack of accurate output control during strip condition fluctuations.

The use of the voltage across an induction heating coil to control an R.F. oscillator is unique and provides different control techniques for processing induction heating.

The primary object of the present invention is the provision of an apparatus and method of ultra rapid annealing of a thin steel strip by induction heating, which apparatus and method uses a radio frequency vacuum tube oscillator driving an induction heating coil surrounding the strip and controlled to maintain at least 1,000° F./second heating in the strip as the strip varies in thickness and/or other parameters.

Another object of the present invention is the provision of an apparatus and method, as defined above, which apparatus and method employs a radio frequency vacuum tube oscillator controlled by feedback of the coil voltage from the induction heating coil.

Still another object of the present invention is the provision of an apparatus and method, as defined above, which apparatus and method utilizes coil voltage of the induction heating coil to control a radio frequency vacuum tube oscillator in various induction heating processes.

Another object of the present invention is the provision of an apparatus and method, which apparatus and method can process long runs of steel strip with a minimum of scrap caused by failure to ultra rapid anneal the strip.

Yet another object of the present invention is the provision of an apparatus and method, as defined above, which apparatus and method controls the oscillator when the strip tends to regress from ultra rapid annealing detected by progression into and/or through the Curie point temperature of the steel strip.

Another object of the present invention is the provision of an apparatus and method, as defined above, which apparatus and method protects the power supply driving the radio frequency oscillator and the vacuum tube of the oscillator from overloading as the current demands of the induction heating coil tend to increase beyond preselected values.

These and other objects and advantages will become apparent from the following description of the preferred embodiment of the present invention.

BRIEF DESCRIPTION OF DRAWINGS

FIGS. 2A, 2B and 2C, taken together, illustrate the preferred embodiment of the present invention with respect to the grid feedback and radio frequency oscillator components of the present invention;

PREFERRED EMBODIMENT

Figure 1:
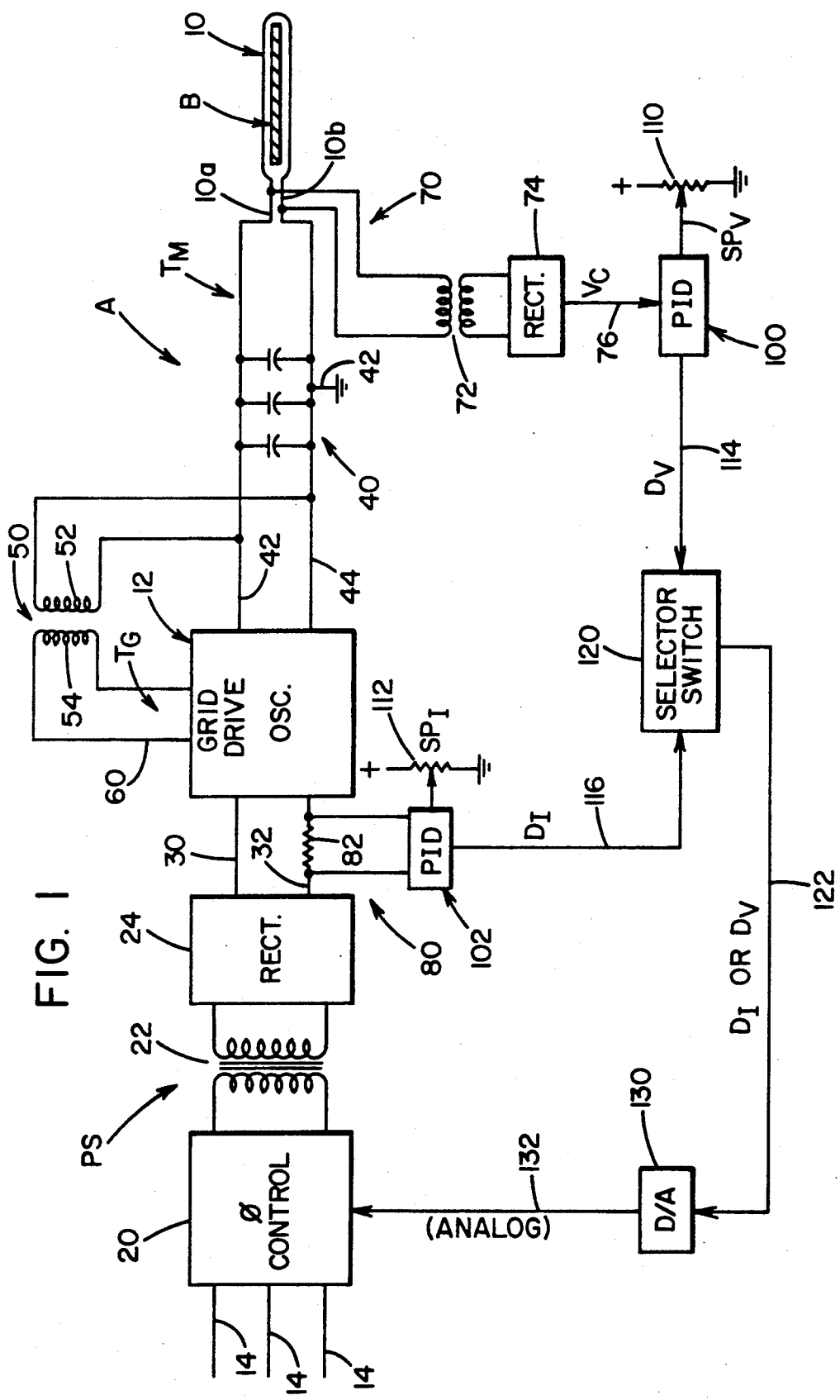
FIG. 1 is a schematic wiring diagram of the preferred embodiment of the present invention.
Figure 8:
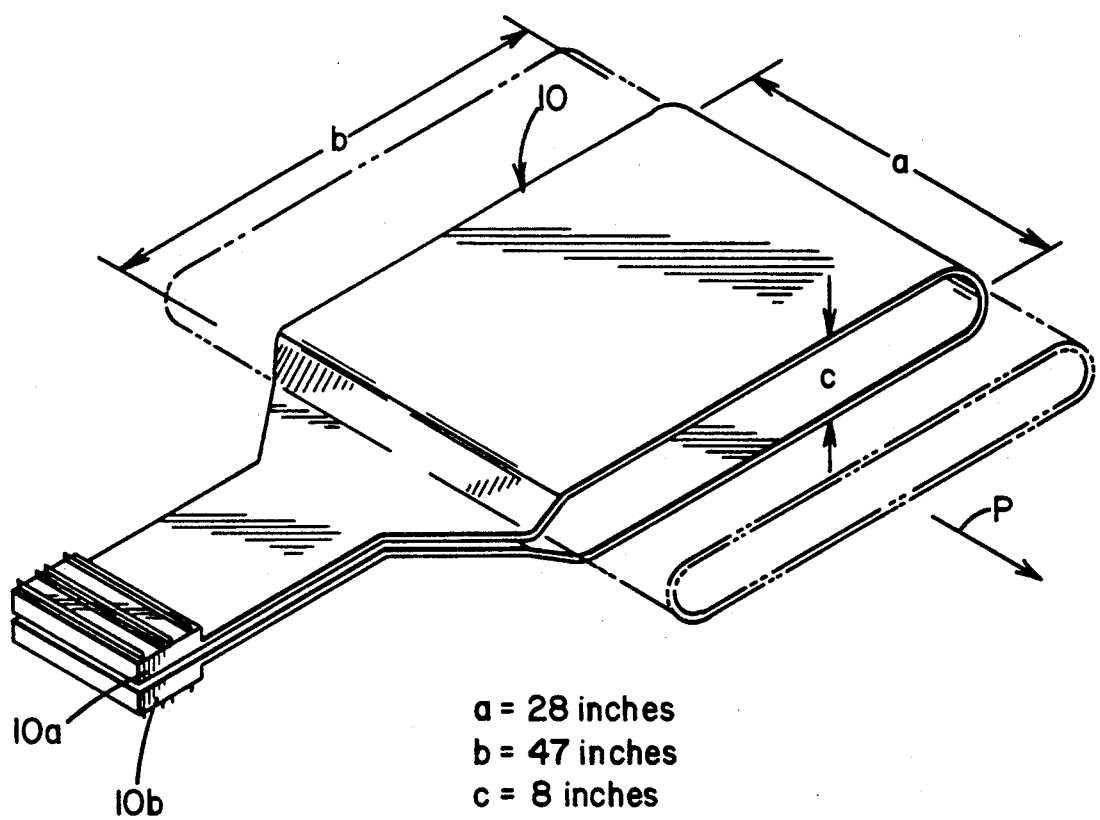

Referring now to the drawings wherein the showings are for the purpose of illustrating a preferred embodiment of the invention only and not for the purpose of limiting same, FIG. 1 shows an apparatus A for ultra rapid annealing (URA) of a rapidly moving thin, magnetic steel strip B having a thickness in the general range of 0.0045-0.0280 inches. Preferably, the steel is very thin strip. The need for ultra rapid annealing of such strip is known in the art and attempts have been made to accomplish this annealing process by induction heating; however, such attempts have not been successful for normal thin sheet steel having a variety of variations in thickness and conditions until adoption of the improvements in the apparatus and method of the present invention. In accordance with the apparatus and method of the present invention, steel strip B having a width which may approach or exceed 24 inches, is passed along a feed line or path P into and through an induction heating coil 10, best shown in FIG. 8. This heating coil is a single turn flat induction heating coil having a length a in the direction of path P of the moving strip. Coil 10 has a width b and a vertical spacing c which allows internal insulation and sufficient vertical space for movement of the thin strip as it passes through induction heating coil 10. The space around the strip can accommodate insulation of the inductor or coil 10. In the preferred embodiment of the invention, the dimensions of the coil are those set forth on FIG. 8. With these dimensions, strip between 0.006-0.015 inches has been successfully processed in an ultra rapid annealing state by employing the apparatus set forth schematically in FIG. 1. This apparatus A includes a radio frequency oscillator 12 with an output in excess of 400 KHz and the power of greater than about 600 KW. Appropriate D.C. power supply PS feeds the plate circuit of the tube in oscillator 12 and comprises a three phase input through lines 14 into a somewhat standard phase controller 20 passing an alternating current through the primary winding of input transformer 22 for directing alternating current into rectifier 24 having D.C. output terminals 30, 32 connected to output lines 30, 32. Power supply PS is standard and directs D.C. current through lines 30, 32 to the plate circuit of the vacuum tube forming the basic component of radio frequency oscillator 12. In accordance with an aspect of the preferred embodiment of the invention, a capacitor network or bank 40 is connected directly adjacent inductor or coil 10 to form a tank circuit $T_M$ driven by the outputs of oscillator 12 and having a ground connection at terminal 42. By placing capacitor bank 40 directly adjacent induction heating coil 10 to form tank circuit $T_M$, the output or main tank circuit has a natural frequency to assure an efficient transfer of power to strip B. The main tank circuit is powered directly by the output leads 42, 44 of oscillator 12. There is no coupling transformer between the oscillator and the main tank circuit so the voltage of the coil is created directly by the output voltage of the oscillator.

In accordance with the present invention, the grid drive of oscillator 12, which is operated in a class C mode, is isolated from main tank circuit $T_M$ by an isolation transformer 50 having a primary 52 in parallel with the main output tank circuit and a secondary 54 forming the grid drive circuit 60 of oscillator 12. Primary 52 is not part of the tank circuit $T_M$. In addition, this primary is not part of the grid drive circuit 60. Thus, in accordance with an aspect of the invention, the tank circuit $T_M$ has a natural frequency different from the natural frequency of the grid tank circuit $T_G$. In practice, the natural frequency of the main tank circuit is greater than 400 KHz and less than 500 KHz and preferably about 435 KHz. The natural frequency of the grid drive circuit is greater than 500 KHz and preferably about 510 KHz. Thus, the grid tank circuit is decoupled and detuned from the main tank circuit. This is accomplished by the isolation transformer 50 having a primary which is connected across the main tank circuit and does not form a part of the main tank circuit in accordance with standard feedback technology for power oscillators using vacuum tubes. By decoupling and detuning the grid drive circuit from the main tank circuit formed adjacent the induction heating coil 10, the grid can be driven at a maximum D.C. bias and maximum current parameters which will be explained in more detail with respect to FIGS. 2A, 2B and 2C. By isolating the grid drive from the main tank circuit, the voltage at induction heating coil 10 can be drastically increased when employing a 600 watt vacuum tube by Siemens (RS 3500 CJ). By employing the present invention, coil voltage in excess of 4800 volts can be obtained. It is necessary to have a coil voltage in excess of about 4400 volts to assure maintenance of URA of the moving strip at a velocity in excess of 150 ft/min. This voltage must be sufficient to heat the strip above the Curie point temperature as the strip passes through the coil. The voltage is preferably in the general range of 2500-5000 volts with a strip speed in excess of 100-150 ft/min to produce a power density in strip B as it passes into and through induction heating coil 10 to give a temperature rise of 500° F. per second in the strip. This rate of heating is accomplished when the strip passes beyond the Curie point temperature as the strip is in the coil. The power density is determined by measuring or sensing the coil voltage $V_C$ of coil 10 adjacent the coil itself. Since the coil has a fixed length a and a fixed width b the power density is a function of coil voltage measured directly at the coil itself. The coil voltage $V_C$ is the primary parameter employed for controlling oscillator 12 by adjusting the phase of phase controller 20 of power supply PS. To accomplish this coil voltage feedback control of the power supply PS, the voltage of the coil is sensed directly at coil 10 at or adjacent to fishtail connections 10a, 10b. This is illustrated in FIG. 1 wherein the coil voltage sensing mechanism or circuit 70 is illustrated as including a transformer 72 connected to a rectifier 74 having appropriate high time constant filtering at the output 76. Thus, coil voltage $V_C$ is directed through line 76 forming the output or feedback signal of the coil voltage sensing circuit 70. This parameter is employed for normal control of the input power supply PS in accordance with standard principles. Voltage control is quite accurate and essential to maintenance of URA of the moving strip as the thickness and other parameters of the strip change from position-to-position. Using a voltage control for the input of oscillator 12 substantial reduction of scrap is accomplished since the ultra rapid annealing stage or state is maintained with widely varying strip conditions. In accordance with an aspect of the invention, the output current through lines 30, 32 is detected or sensed by a circuit or mechanism 80 including a voltage transducer 82 which will produce a voltage proportional to the D.C. current flowing to the plate circuit of the tube in oscillator 12. Of course, a current transformer or other appropriate arrangements could be used to directly sense the D.C. current at the input of oscillator 12. The output of circuit 70 and the circuit 80 are individually directed to PID circuits 100, 102, respectively. These types of circuits are well known in the control art and have a functional block diagram generally illustrated in FIG. 4 and output characteristics shown in the graphs of FIG. 5.

Figure 4:
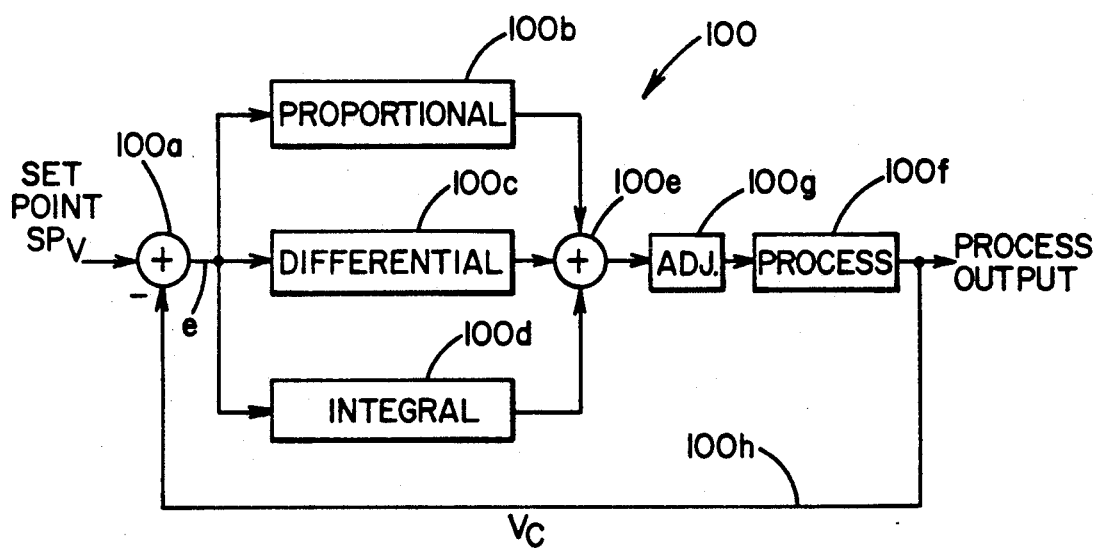
FIG. 4 is a block diagram disclosing the PID module utilized in the control feedback network constructed in accordance with the preferred embodiment of the present invention.
Figure 5:
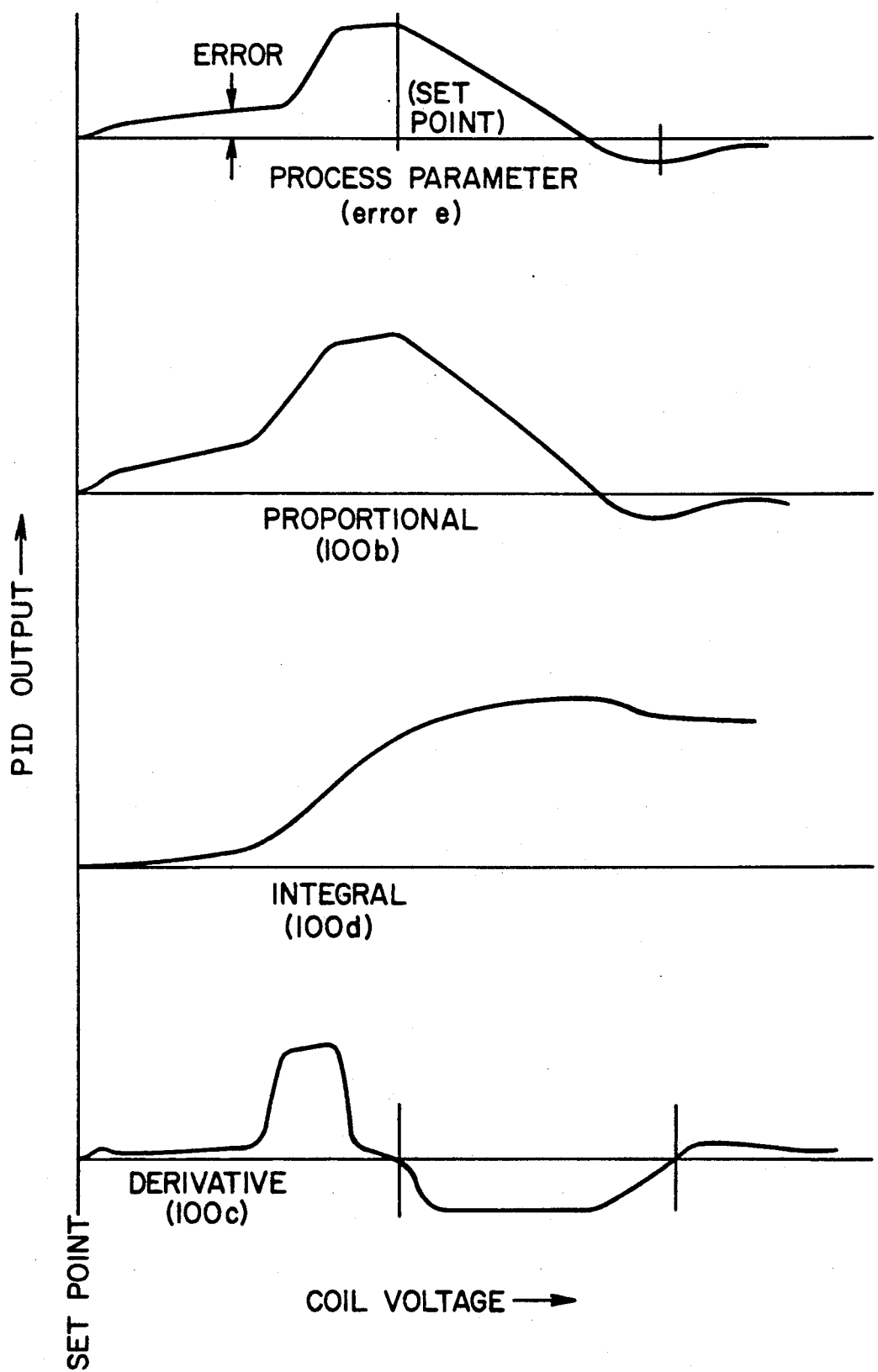
FIG. 5 is a series of graphs illustrating the output of the PID network set forth in FIG. 4.

Referring more particularly to FIG. 4, PID circuit 100 is illustrated in detail. This illustration applies equally to PID circuit or network 102. An input summing junction 100a sums the set point voltage $SP_V$ with the actual coil voltage $V_C$. This comparison produces an error signal e which is directed simultaneously to proportional network 100b, differential network 100c and integral network 100d. The signals at the output of these networks is summed at junction 100e to control the "process" indicated as block 100f. In this instance the process 100f is the total of apparatus A. The output of summing junction 100e controls the power supply phase controller 20 and the output of the process is measured at fishtail connections 10a, 10b of heating coil 10. This gives a feedback signal in line 100h. The control loop shown in FIG. 4 employs the coil voltage to control apparatus A. In FIG. 5, the error e creates a proportional signal from network 100b. This would be the normal type of control parameter employed in the feedback network; however, a PID network also includes an output which is the integration of error e. This output compensates for slow, long term drift of the set point voltage. Network 100c produces a differential of error e. This output compensates for rapid excursions away from the set point. By adding the three output signals at summing junction 100e, the PID accurately tracks variations of the coil voltage $V_C$ before effecting corrective action in process 100f. In accordance with an aspect of the present invention, an adjustment function 100g is added to a standard PID. This adjustment feature increases the magnitude of the output of summing junction 100e before being employed in corrective action at the process being controlled. This concept increases or decreases the feedback influence of errors in coil voltage. This same network is employed for the output of PID 102 driven by the D.C. current to the plate of the vacuum tube in oscillator 12. In accordance with the present invention, the output of PID 100 and PID 102 is directed through lines 114, 116 to a magnitude digital selector switch or program 120. This switch or program has an output 122 which directs either deviation signal $D_I$ or $D_V$ to the digital to analog converter 130 having an output 132 for driving phase controller 20. In accordance with an aspect of the invention, the smaller of the two deviation signals in lines 114, 116 is used as the control signal. When the current approaches the current set point and the voltage is away from the voltage set point a greater amount, switch or software 120 selects the current deviation signal to control the power supply of the oscillator to control the D.C. voltage for adjusting the input current.

OPERATION OF APPARATUS AND METHOD

Figure 6:
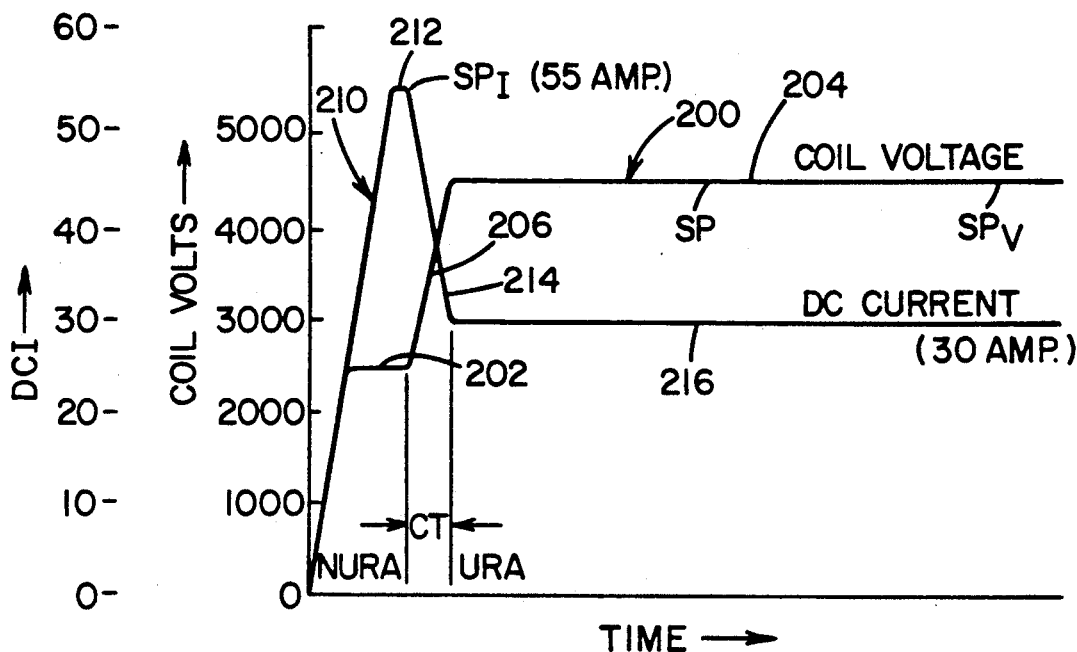
FIG. 6 is a comparison of the PID output from the start of the process utilizing the apparatus and method of the present invention.

Strip B is moved into and through coil 10 along path P as tank circuit $T_M$ is driven by oscillator 12. The grid of the oscillator is driven by isolation transformer 50 and has a different natural frequency than the main tank circuit. The strip is moved at a rapid velocity exceeding about 100-150 ft/min through the coil and is heated with a power density greater than that to produce heating of over 500° F. per second to ultra rapidly anneal the moving strip. The strip is heated and maintained at a temperature above the Curie point temperature of the strip moving through the coil. A selected temperature above the Curie point may be maintained with higher coil voltages. When the strip is first passed through the coil 10 and the coil is first energized by oscillator 12, the strip has a temperature less than 1250° F. This is the Curie point temperature for the moving strip. Thus, the strip is ferromagnetic and not deemed ultra rapidly annealed. In this condition, the oscillator 12 is controlled by the input D.C. current to the plate in the vacuum tube of oscillator 12 by deviation signal $D_I$. This start up is illustrated in the graph shown in FIG. 6. At the start of a strip run, the D.C. current to the plate circuit of the oscillator is compared to the current set point $SP_I$. This sensed current is represented by line 210, which line rapidly increases along input portion 210 until the current reaches the set point current level, or value 212. At that time, the sensed coil voltage of line 200 moves up to a plateau 202. Regulation is by the D.C. current since the maximum power will be created by the maximum amount of input current to the oscillator. This maximum current does not create the maximum obtainable voltage in coil 10 which is needed for ultra rapid annealing. As the moving strip increases in temperature, it passes through the Curie point range CT between the non-ultra rapid annealing (NURA) to the ultra rapid annealing (URA) state. This transition area CT causes a "hand shake" or change of parameters between current and voltage. As the Curie point temperature is approached and exceeded, the current rapidly decreases along line 214 while the voltage drastically increases along line 206. When the Curie point has been exceeded, the voltage shown as line 200 reaches the level 204, while the D.C. current has decreased to about 30 amps shown as line 216. This is the ultra rapid annealing state for the moving strip since the strip is now being heated in excess of the Curie point temperature of 1250° F. At that stage, the selector switch or software 120 shifts from control by D.C. current to control by coil voltage, which control is the normal continuous operating condition for apparatus A and the method of the present invention. The curves shown in FIG. 6 are essentially the voltage and current curves used in creating the error signal by the PID networks 100, 102. In the URA stage, the coil voltage of line 200 is closer to the set point voltage than the D.C. current is to the set point current. Thus, voltage control is selected by switch 120. If at any time during the operation of apparatus A the requested D.C. current in line 210 increases and moves closer to the set point current than the voltage is to the set point voltage, then the current takes over from the voltage control temporarily until URA is again established as indicated by a drop in the D.C. current to the oscillator 12.

Figure 7:
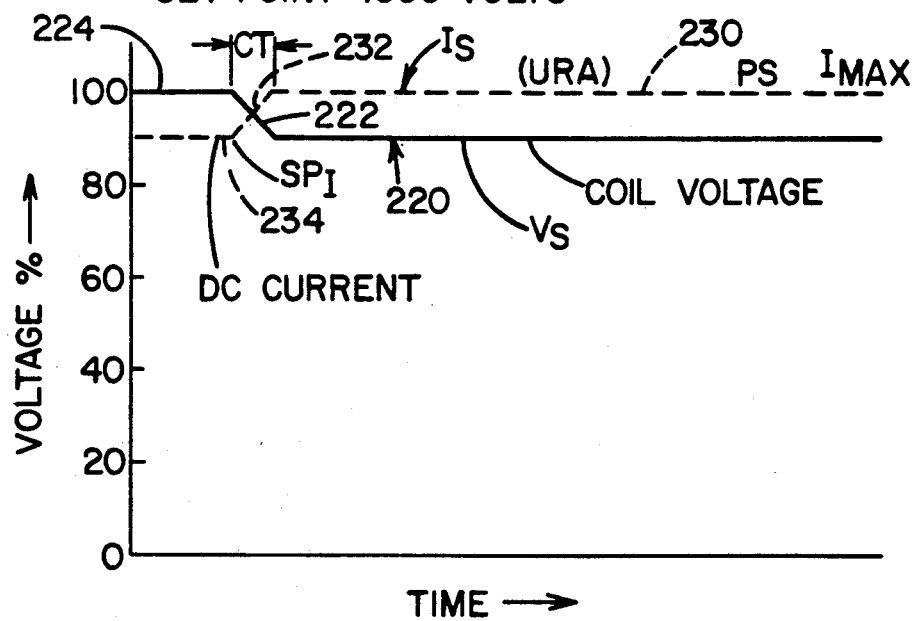
FIG. 7 is a diagram showing the relationship of input D.C. current and coil voltage before and after the process enters the ultra rapid annealing state at the start of annealing process; and, FIG. 8 is a pictorial view of the induction heating coil employed in the preferred embodiment of the present invention.

In FIG. 7, the operating condition of the present invention is illustrated wherein voltage curve 220 and D.C. current curve 230 are illustrated for an operation wherein set point current is 55 amps and the set point voltage is 4500 volts. This graph shows a steady state condition where coil voltage is maintained at level 224. D.C. current is maintained at the low level 234 as shown in the URA section to the right of FIG. 6. If the current in line 230 drifts toward the maximum current of the power supply, then the apparatus is shifted to a D.C. current control mode and released from a coil voltage control mode. This alternate control mode is maintained until the system A brings the strips back into the URA state. By employing this concept of two interrelated control modes, maximum power is directed to the moving strip even when URA is not being accomplished. Thus, URA is maintained for a maximum length of time. In addition, fluctuations in the strip do not cause the method and apparatus to shift to the non-ultra rapid annealing (NURA) stage. Thus, there is a normal voltage control for the apparatus and method which is backed up by a current control state. This minimizes the time during which ultra rapid annealing is not accomplished by apparatus A and the method of operating the same.

DETAILS OF APPARATUS A (FIG. 2)

Figure 2:
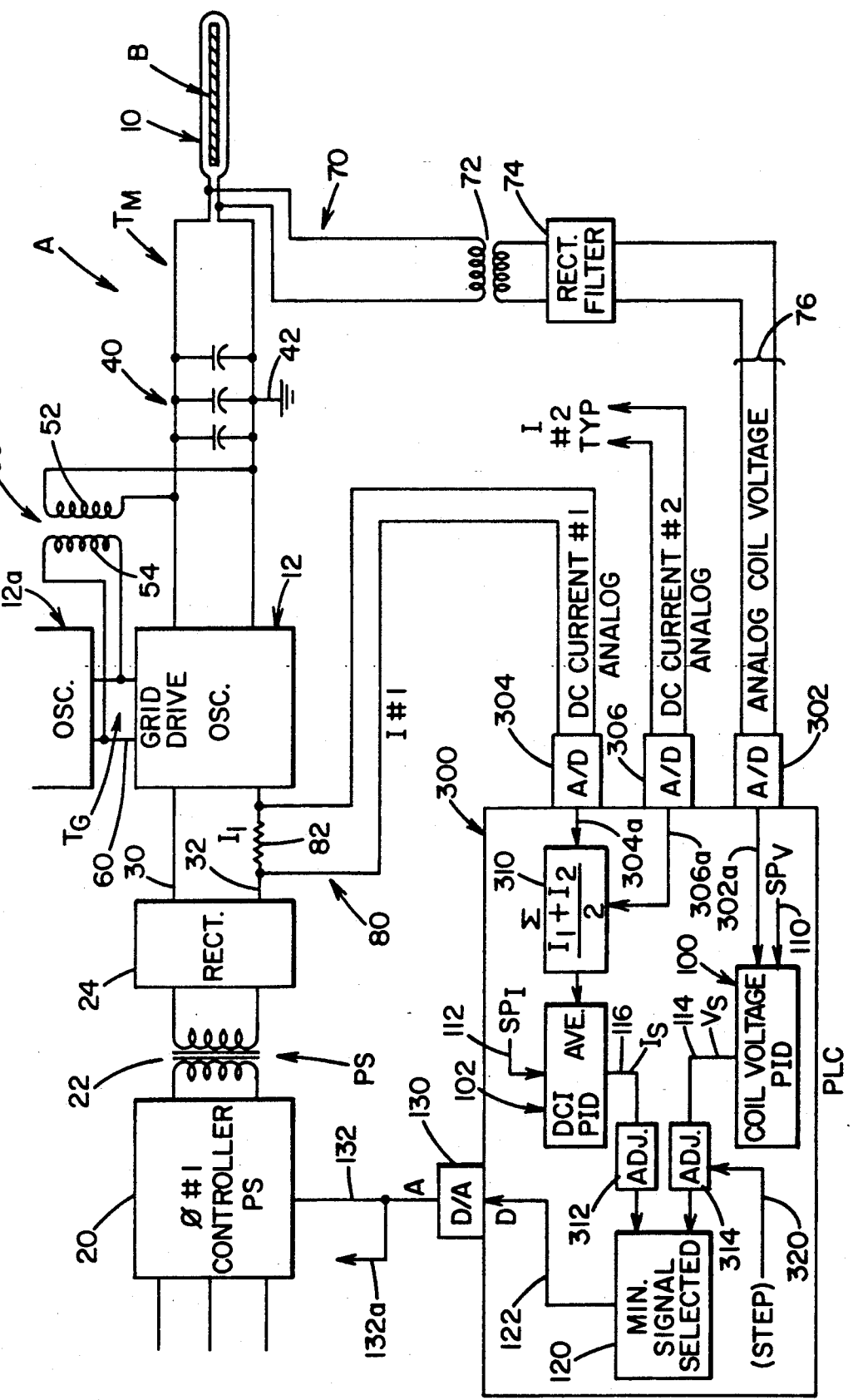
FIG. 2 is a more detailed wiring diagram of the preferred embodiment shown in FIG. 1.

The schematic diagram of apparatus A contained in FIG. 1 is shown in more detail in FIG. 2. In practice, two separate power supplies drive separate oscillators 12, 12a to produce the desired output power. The maximum power of the Siemens RS 3500 CJ vacuum tube is in the neighborhood of 500-600 KW; however, to assure that the necessary power is available for the heating process, a second oscillator stage connected in parallel is incorporated. This second stage is driven as a slave system operated in tandem with the master oscillator system shown in FIG. 1 and in full line in FIG. 2. The output of D/A converter 130 is connected in parallel to the power supplies for both oscillators. The same isolation transformer 50 drives the grids of oscillators 12, 12a. A single voltage feedback system is employed in the preferred embodiment; however, two D.C. current signals are sensed and fed back to the process logic controller 300. Thus, the process logic controller 300 includes inputs to converter 302 driven by the sensed coil voltage, converter 304 driven by the D.C. current sensed from the master oscillator and converter 306 driven by the D.C. current of the slave oscillator 12a. The outputs 304a, 306a are averaged by network 310, which may be a software digital processing routine. The output of network 310 is the average of the D.C. currents from both oscillators. This output drives current PID 102 having a set point $SP_I$ 112 as illustrated in FIG. 1. Output 302a from converter 302 drives the coil voltage PID 100 having set point $SP_V$ 110 as illustrated in FIG. 1. Outputs 114, 116 are directed to adjusting networks 312, 314, respectively. If the relative magnitude of the deviation signals in lines 114, 116 are to be adjusted, the adjusting networks 312, 314 can be employed. In accordance with an aspect of the preferred embodiment of the invention, the line 320 is employed for indexing the effect of adjustment of network 314 so that the magnitude of the effect of deviation signal $D_V$ in line 114 can change in steps between 22% and 40% at the start up of the apparatus A. This allows a lesser effect of the coil voltage during the start up of the apparatus. These steps last for about 10 seconds whenever conversion from D.C. current control to coil voltage occurs; however, this feature is not required for the invention. Selector switch 120 operates as previously described. FIG. 2 is employed for the purpose of illustrating in more detail certain aspects of the preferred embodiment of the present invention.

OSCILLATOR CIRCUIT (FIGS. 3, 2A, 2B, 2C)

Figure 2A:
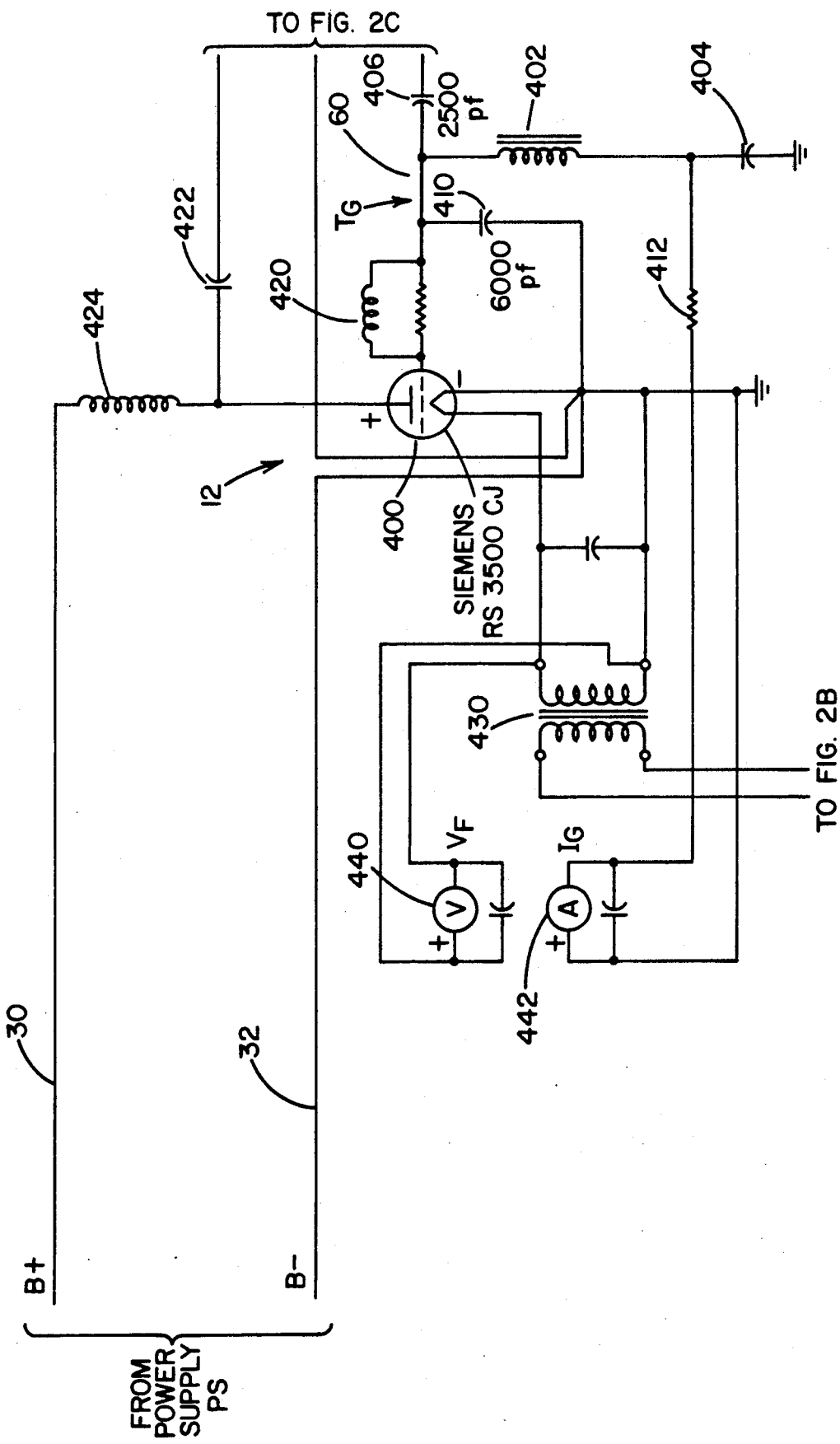
Figure 3:
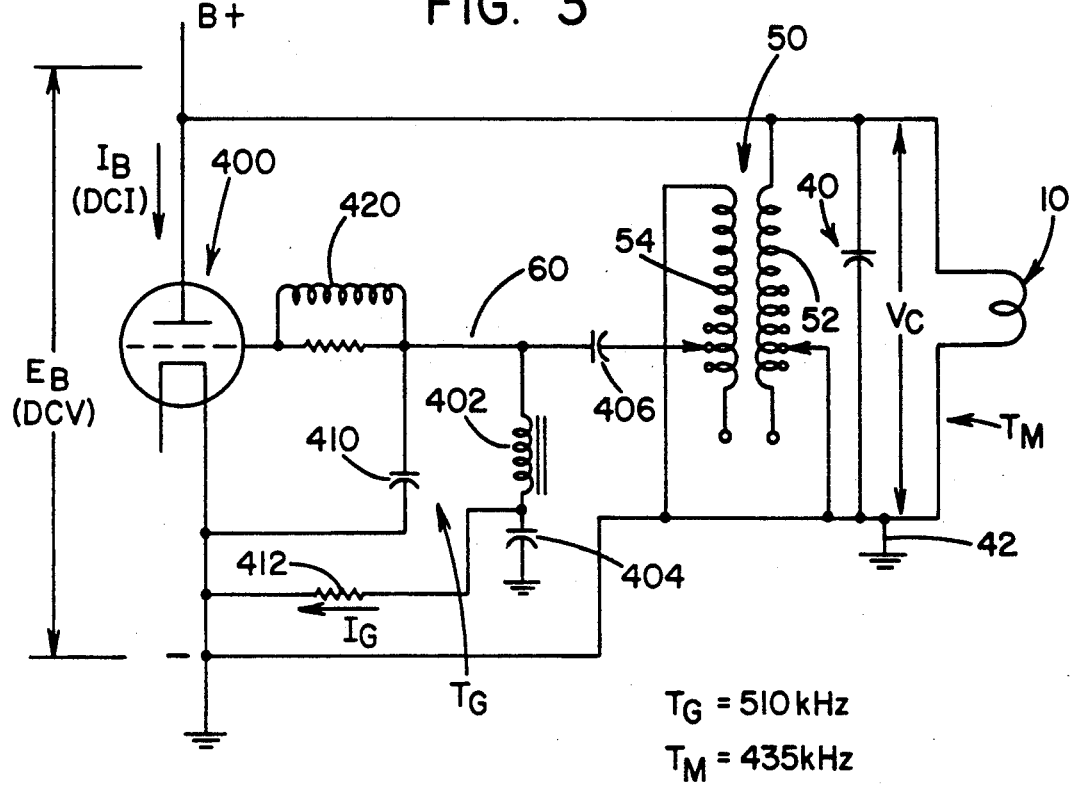
FIG. 3 is a simplified wiring diagram illustrating the basic features of the invention as set forth in FIGURES 2A-2C.

Referring now more particularly to FIGS. 3 and 2A, vacuum tube, 400 which is a Siemens RS 3500 CJ tube, is loaded and biased to a maximum to obtain the maximum output power. The grid has a natural frequency of over 500 KHz and preferably 510 KHz. This is compared to the main tank circuit natural frequency of over 400 KHz and less than 500 KHz and, preferably, 435 KHz. The basic concept of isolating the two tank circuits is to provide a grid which is not coupled or tuned to the main output tank circuit. In addition, the grid is not to be in any way coupled to a transformer having a winding forming part of the output tank circuit. This is an essential feature of the present invention and allowed loading the vacuum tubes to a maximum to obtain the necessary voltage in excess of 4400 volts at induction heating coil 10. In the preferred embodiment, the parameters of the various components are those set forth in FIG. 2A. Grid choke 402 and grid filter capacitor 404 merely detunes and isolates the D.C. bias created across resistor 412. The grid is driven through capacitor 406. Divider capacitor 410 places the grid of tube 400 above ground to allow maximum loading of tube 40. A standard parasitic snubber system or network 420 is used to isolate the grid from current variations.

Figure 2C:
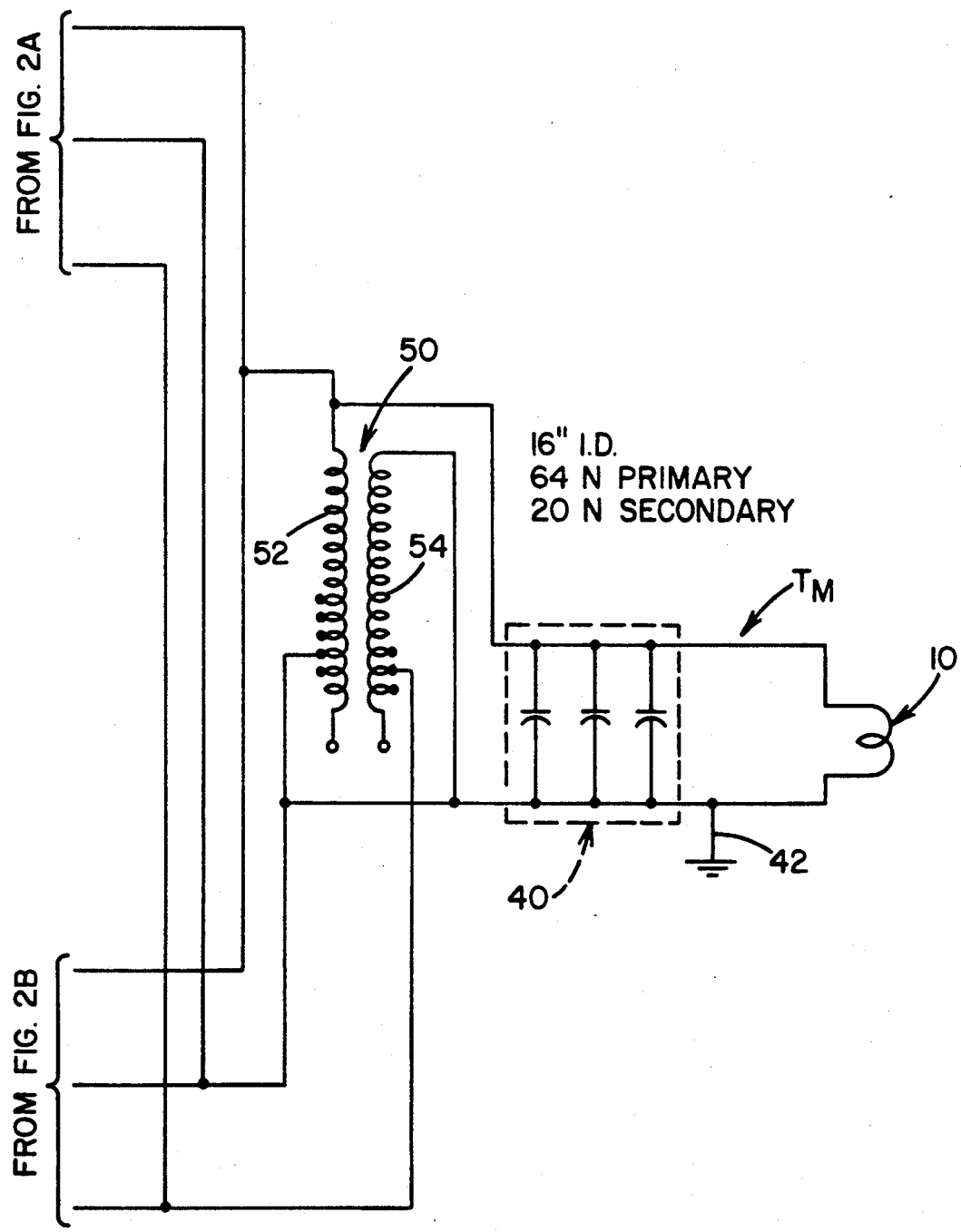

Slave tube 400a forms the oscillator 12a and is illustrated in detail in FIG. 2B. The various components have the same values and functions as explained with respect to tube 400. Blocking capacitor 422 isolates plate circuit from the output tank circuit. The standard radio frequency choke 424 is connected in series with the positive terminal from the power supply PS. Transformer 430 is employed for heating the filament of tube 400. Filament voltage is indicated by meter 440 and the grid current is indicated by meter 442. These and other meters can be employed for displaying the various parameters of the oscillator 12. As shown in FIG. 2C, transformer 50 has a 16 inch I.D. with both a tapped primary winding and a tapped secondary winding. The number of turns in the primary and secondary are selected as indicated on the drawing.

By using these parameters, the oscillators 12, 12a have a maximum obtainable output power for driving induction heating coil 10 to cause the strip B to pass through the Curie point temperature into the ultra rapid annealing state determined by both the velocity of the strip and the power density applied to the strip.

EXAMPLES

The apparatus and method have been found to create URA with a coil voltage in excess of about 2500 volts. Listed hereafter are several examples where URA has been accomplished by using the preferred embodiment of the present invention with voltages exceeding 4300 volts. To accomplish URA, relatively thin strips are employed or the velocity of the strip is near the lower limit of about 145–150 ft/min.

EXAMPLE A (URA)

0.011 Strip Thickness
145 fpm Strip Velocity
860° F. Preheat Temperature

| Non-URA (manual) Vcoil = 2300 | | URA (auto) Vcoil = 4350 | |
|---|---|---|---|
| #1 Run | #2 Run | #1 Run | #2 Run |
| 8.6 $E_B$ | 8.8 Kvolts | 10.2 $E_B$ | 10.4 Kvolts |
| 2.3 $I_G$ | 2.4 amps | 5.6 $I_G$ | 5.8 amps |
| 43 $I_B$ | 43 amps | 31 $I_B$ | 31 amps |

EXAMPLE B (URA)

0.009" Strip Thickness
35.25" wide
750° F. Preheat Temperature
70 fpm Strip Velocity

| NURA Condition: | |
|---|---|
| Coil Voltage: | 2500 volts |
| Plate Voltage: | 10.2 kv |
| Plate Current: | 48 amps |
| URA Operating Conditions: | |
| Coil Voltage | 4750 Volts |
| Nominal Coil Voltage | 4750–4800 Volts |
| DC Volatage | 11.3  11.2 KV |
| DC Current | 34–34 amps |
| Grid Current | 3.8–4.0 amps |
| Ac Line Current | 470 Nom. |
| PS #1 | 720 Non. |
| PS #2 | 730 Nom. |
| Calculated DC Power | 765 kw |
| Calculated AC Power | 1172 KVA |
| Calculated PF | .653 |

EXAMPLE (URA)

0.006 Strip Thickness
773° F. Preheat
162 fpm Strip Velocity

| DCV | 10.2 kv |
|---|---|
| IG | 5.6 amps |
| DCI | 28 amps |
| Coil V | 4300 volts |

The following example did not reach URA with an actual voltage of 4200 volts on the coil. It is believed that the speed with relationship to the thickness and the low voltage caused this to occur.

EXAMPLE D (NURA)

9 Mill (8.55) Strip Thickness
170 fpm Strip Speed
730° to 740° F. Preheat Temperature

| Control Set PT$_V$ | 4300 Volts | |
|---|---|---|
| Actual V$_C$ | 4200 Volts | |
| | PS #1 | PS #2 |
| DC Voltage | 11.6 KV | 11.3 KV |
| DC Current | 34.5 amps | 34.5 amps |
| Grid | 3.8 amps | 4.0 amps |
| Outlet Strip Temperature | 1246° F. | |

SUMMARY

With velocities in excess of about 150 ft/min and coil voltages above 4400 volts, URA is accomplished and maintained except in drastic parameter changes of the moving strip. When that occurs, the backed up current control mode allows a rapid shift back into the URA state. The examples provided herein are examples showing that above the parameters set forth herein URA is obtainable. Example B employs a coil voltage of 4750 volts. This obtains URA even at the high velocity of 170 ft/min. Only by loading of the tubes as set forth in FIGS. 3, 2A, 2B and 2C can the high voltage be obtained for URA. In addition, only by the control network can this URA be sustained over long strip runs. It has been found that by using the coil voltage control concept URA may be obtained at voltages as low as about 2500 volts with accurate voltage control. These two features of the present invention are combined to allow continuous and assured URA operating conditions for thin, rapidly moving strip.

Having defined the invention, the following is claimed:

1. An induction heating apparatus for ultra rapid annealing of a ferromagnetic strip moving at a selected velocity along a given path, said apparatus comprising: a vacuum tube R.F. oscillator having a D.C. input power supply providing D.C. voltage and D.C. current to said oscillator, a grid, a radio frequency output, and a grid feedback circuit for driving said grid; an induction heating coil surrounding said strip, said coil having a known length along said path and a parallel capacitor bank forming said coil into a tank circuit with a resonant frequency; means for moving said strip into and through said coil at said selected velocity; and, means for sensing the voltage of said induction heating coil and means for adjusting said D.C. voltage of said input power supply in accordance with said sensed coil voltage to maintain the power density in said strip at a selected level as said strip passes through said coil to raise the temperature of said moving strip at a rate of at least about 500° F./sec to above the Curie point temperature.

2. An apparatus as defined in claim 1 including an isolation transformer adjacent said induction heating coil with a primary winding in parallel with said tank circuit of said coil and a secondary winding, means for energizing said grid feedback circuit by said secondary winding.

3. An apparatus as defined in claim 2 wherein said grid feedback circuit has a resonant frequency different from said resonant frequency of said tank circuit.

4. An apparatus as defined in claim 3 wherein said resonant frequency of said tank circuit is less than the resonant frequency of said grid feedback circuit.

5. An apparatus as defined in claim 4 wherein said induction heating coil is a single turn coil.

6. An apparatus as defined in claim 5 including means for preheating said strip to a temperature in the range of 600° F.–800° F. before said strip is moved into said induction heating coil.

7. An apparatus as defined in claim 5 wherein said grid feedback circuit includes a resistance between said secondary and the cathode of said tube, said resistance is resistors sufficient to maximize the D.C. bias to said tube.

8. An apparatus as defined in claim 3 including means for creating a voltage set point, means for comparing said sensed coil voltage to said voltage set point and said adjusting means to create a voltage deviation signal including means for adjusting said D.C. voltage to reduce said voltage deviation signal.

9. An apparatus as defined in claim 8 including means for sensing the value of the D.C. current to said tube, means for comparing said sensed D.C. current with a current set point to create a current deviation signal and means for controlling said D.C. current by said current deviation signal when said voltage deviation signal is greater than said current deviation signal.

10. An apparatus as defined in claim 2 wherein said induction heating coil is a single turn coil.

11. An apparatus as defined in claim 2 including means for preheating said strip to a temperature in the range of 600° F.–800° F. before said strip is moved into said induction heating coil.

12. An apparatus as defined in claim 2 including means for creating a voltage set point, means for comparing said sensed coil voltage to said voltage set point and said adjusting means to create a voltage deviation signal including means for adjusting said D.C. voltage to reduce said voltage deviation signal.

13. An apparatus as defined in claim 12 including means for sensing the value of the D.C. current to said tube, means for comparing said sensed D.C. current with a current set point to create a current deviation signal and means for controlling said D.C. current by said current deviation signal when said voltage deviation signal is greater than said current deviation signal.

14. An apparatus as defined in claim 3 wherein said resonant frequency of said coil tank circuit exceeds 400 KHz.

15. An apparatus as defined in claim 14 wherein said resonant frequency of said grid feedback circuit is greater than 500 KHz.

16. An apparatus as defined in claim 1 wherein said grid feedback circuit includes grid divider capacitor network and a drive capacitor network including a larger capacitance in said divider network and a smaller capacitance in said drive network, said network drive causing said grid to operate at a natural frequency different from the resonant frequency of said tank circuit.

17. An apparatus as defined in claim 16 wherein said larger capacitance is about 6000 pf and said smaller capacitance is about 2500 pf and said tube is a Siemens RS3500CJ.

18. An apparatus as defined in claim 1 wherein said grid feedback circuit has a resonant frequency different from said resonant frequency of said tank circuit.

19. An apparatus as defined in claim 18 wherein said resonant frequency of said tank circuit is less than the resonant frequency of said grid feedback circuit.

20. An apparatus as defined in claim 19 wherein said induction heating coil is a single turn coil.

21. An apparatus as defined in claim 18 wherein said induction heating coil is a single turn coil.

22. An apparatus as defined in claim 18 including means for preheating said strip to a temperature in the range of 600° F.-800° F. before said strip is moved into said induction heating coil.

23. An apparatus as defined in claim 1 wherein said induction heating coil is a single turn coil.

24. An apparatus as defined in claim 23 including means for preheating said strip to a temperature in the range of 600° F.-800° F. before said strip is moved into said induction heating coil.

25. An apparatus as defined in claim 23 including means for creating a voltage set point, means for comparing said sensed coil voltage to said voltage set point and said adjusting means to create a voltage deviation signal including means for adjusting said D.C. voltage to reduce said voltage deviation signal.

26. An apparatus as defined in claim 25 including means for sensing the value of the D.C. current to said tube, means for comparing said sensed D.C. current with a current set point to create a current deviation signal and means for controlling said D.C. current by said current deviation signal when said voltage deviation signal is greater than said current deviation signal.

27. An apparatus as defined in claim 1 including means for preheating said strip to a temperature in the range of 600° F.-800° F. before said strip is moved into said induction heating coil.

28. An apparatus as defined in claim 27 including means for creating a voltage set point, means for comparing said sensed coil voltage to said voltage set point and said adjusting means to create a voltage deviation signal including means for adjusting said D.C. voltage to reduce said voltage deviation signal.

29. An apparatus as defined in claim 28 including means for sensing the value of the D.C. current to said tube, means for comparing said sensed D.C. current with a current set point to create a current deviation signal and means for controlling said D.C. current by said current deviation signal when said voltage deviation signal is greater than said current deviation signal.

30. An apparatus as defined in claim 1 including means for loading said oscillator tube with a maximum D.C. bias.

31. An apparatus as defined in claim 1 including means for driving said grid of said oscillator to produce a coil voltage greater than 2500 volts.

32. An apparatus as defined in claim 31 wherein said means for driving grid produces a coil voltage in excess of 4000 volts.

33. An apparatus as defined in claim 1 including means for creating a voltage set point, means for comparing said sensed coil voltage to said voltage set point and said adjusting means to create a voltage deviation signal including means for adjusting said D.C. voltage to reduce said voltage deviation signal.

34. An apparatus as defined in claim 33 wherein said voltage set point corresponds to a coil voltage greater than 2500 volts.

35. An apparatus as defined in claim 33 wherein said voltage set point corresponds to a coil voltage of greater than 4000 volts.

36. An apparatus as defined in claim 33 wherein said voltage set point corresponds to a coil voltage in the general range of 2500°-5000° F.

37. An apparatus as defined in claim 33 including means for sensing the value of the D.C. current to said tube, means for comparing said sensed D.C. current with a current set point to create a current deviation signal and means for controlling said D.C. current by said current deviation signal when said voltage deviation signal is greater than said current deviation signal.

38. An apparatus as defined in claim 1 including means for grounding said coil tank circuit.

39. An apparatus as defined in claim 1 wherein said resonant frequency of said coil tank circuit exceeds 400 KHz.

40. An apparatus as defined in claim 39 including means for maintaining said voltage of said coil at a level greater than 2500 volts.

41. An apparatus as defined in claim 1 including means for maintaining said voltage of said coil at a level greater than 2500 volts.

42. An induction heating apparatus for ultra rapid annealing of a ferromagnetic strip moving at a selected velocity along a given path, said apparatus comprising: a vacuum tube R.F. oscillator having a D.C. input power supply providing D.C. voltage and D.C. current to said oscillator, a grid, a radio frequency output, and a grid feedback circuit for driving said grid; an induction heating coil surrounding said strip, said coil having a known length along said path and a parallel capacitor bank forming said coil into a tank circuit with a resonant frequency; means for moving said strip into and through said coil at said selected velocity; means for sensing the voltage of said induction heating coil and means for adjusting said D.C. voltage of said input power supply in accordance with said sensed coil voltage to maintain the power density in said strip at a selected level as said strip passes through said coil to raise the temperature of said moving strip at a rate of at least about 500° F./sec to above the Curie point temperature; means for preheating said strip to a temperature in the range of 600° F.-800° F. before said strip is moved into said induction heating coil; means for sensing the D.C. input current, means for comparing said sensed D.C. input current with a current set point to create a first deviation signal, means for comparing the sensed coil voltage with a voltage set point to create a second deviation signal, and means for controlling input power supply by the lesser of said deviation signals.

43. An induction heating apparatus for ultra rapid annealing of a ferromagnetic strip moving at a selected velocity along a given path, said apparatus comprising: a vacuum tube R.F. oscillator having a D.C. input power supply providing D.C. voltage and D.C. current to said oscillator, a grid, a radio frequency output, and a grid feedback circuit for driving said grid; and induction heating coil surrounding said strip, said coil having a known length along said path and a parallel capacitor bank forming said coil into a tank circuit with a resonant frequency; means for moving said strip into and through said coil at said selected velocity; means for sensing the voltage of said induction heating coil and means for adjusting said D.C. voltage of said input power supply in accordance with said sensed coil voltage to maintain the power density in said strip at a selected level as said strip passes through said coil to raise the temperature of said moving strip at a rate of at least about 500° F./sec to above the Curie point temperature; an isolation transformer adjacent said induction heating coil with a primary winding in parallel with said tank circuit of said coil and a secondary winding, means for energizing said grid feedback circuit by said secondary winding; means for sensing the D.C. input current, means for comparing said sensed D.C. input current with a current set point to create a first deviation signal, means for comparing the sensed coil voltage with a voltage set point to create a second deviation signal, and means for controlling input power supply by the lesser of said deviation signals.

44. An apparatus as defined in claim 43 wherein said grid feedback circuit has a resonant frequency different from said resonant frequency of said tank circuit.

45. An induction heating apparatus for ultra rapid annealing of a ferromagnetic strip moving at a selected velocity along a given path, said apparatus comprising: a a vacuum tube R.F. oscillator having a D.C. input power supply providing D.C. voltage and D.C. current to said oscillator, a grid, a radio frequency output, and a grid feedback circuit for driving said grid; an induction heating coil surrounding said strip, said coil having a known length along said path and a parallel capacitor bank forming said coil into a tank circuit with a resonant frequency; means for moving said strip into and through said coil at said selected velocity; means for sensing the voltage of said induction heating coil and means for adjusting said D.C. voltage of said input power supply in accordance with said sensed coil voltage to maintain the power density in said strip at a selected level as said strip passes through said coil to raise the temperature of said moving strip at a rate of at least about 500° F./sec to above the Curie point temperature; means for sensing the D.C. input current, means for comparing said sensed D.C. input current with a current set point to create a first deviation signal, means for comparing the sensed coil voltage with a voltage set point to create a second deviation signal, and means for controlling input power supply by the lesser of said deviation signals.

46. An induction heating apparatus for ultra rapid annealing of a ferromagnetic strip moving at a selected velocity along a given path, said apparatus comprising: a vacuum tube R.F. oscillator having a D.C. input power supply providing D.C. voltage and D.C. current to said oscillator, a grid, a radio frequency output, and a grid feedback circuit for driving said grid; an induction heating coil surrounding said strip, said coil being a single turn coil and having a known length along said path and a parallel capacitor bank forming said coil into a tank circuit with a resonant frequency; means for moving said strip into and through said coil at said selected velocity; means for sensing the voltage of said induction heating coil and means for adjusting said D.C. voltage of said input power supply in accordance with said sensed coil voltage to maintain the power density in said strip at a selected level as said strip passes through said coil to raise the temperature of said moving strip at a rate of at least about 500° F./sec to above the Currie point temperature; means for sensing the D.C. input current, means for comparing said sensed D.C. input current with a current set point to create a first deviation signal, means for comparing the sensed coil voltage with a voltage set point to create a second deviation signal, and means for controlling input power supply by the lesser of said deviation signals.

47. An induction heating apparatus for ultra rapid annealing of a ferromagnetic strip moving at a selected velocity along a given path, said apparatus comprising: a vacuum tube R.F. oscillator having a D.C. input power supply providing D.C. voltage and D.C. current to said oscillator, a grid, a radio frequency output, and a grid feedback circuit for driving said grid; an induction heating coil surrounding said strip, said coil having a know length along said path and a parallel capacitor bank forming said coil into a tank circuit with a resonant frequency; means for moving said strip into and through said coil at said selected velocity; means for sensing the voltage of said induction heating coil and means for adjusting said D.C. voltage of said input power supply in accordance with said sensed coil voltage to maintain the power density in said strip at a selected level as said strip passes through said coil to raise the temperature of said moving strip at a rate of at least about 500° F./sec to above the Curie point temperature; means for creating a voltage set point, means for comparing said sensed coil voltage to said voltage set point and said adjusting means to create a voltage deviation signal including means for adjusting said D.C. voltage to reduce said voltage deviation signal; and, means for starting said comparing means and means for stepping said magnitude of said voltage deviation from a low value at an initial time to a maximum value at a final time, said duration between said initial time and said final time being less than about 20 seconds and occurring at the start of the operation of said comparing means.

48. An apparatus as defined in claim 47 including means for sensing a maximum current for said input power supply and means for starting said voltage comparing means when said maximum level is reached.

49. An induction heating apparatus for ultra rapid annealing of a ferromagnetic strip moving at a selected velocity along a given path, said apparatus comprising: a vacuum tube R.F. oscillator having a D.C. input power supply providing D.C. voltage and D.C. current to said oscillator, a grid, a radio frequency output, and a grid feedback circuit for driving said grid; an induction heating coil surrounding said strip, said coil having a known length along said path and a parallel capacitor bank forming said coil into a tank circuit with a resonant frequency; means for moving said strip into and through said coil at said selected velocity; means for sensing the voltage of said induction heating coil and means for adjusting said D.C. voltage of said input power supply in accordance with said sensed coil voltage to maintain the power density in said strip at a selected level as said strip passes through said coil to raise the temperature of said moving strip at a rate of at least about 500° F./sec to above the Curie point temperature; an isolation transformer adjacent said induction heating coil with a primary winding in parallel with said tank circuit of said coil and a secondary winding, means for energizing said grid feedback circuit by said secondary winding; means for creating a voltage set point, means for comparing said sensed coil voltage to said voltage set point and said adjusting means to create a voltage deviation signal including means for adjusting said D.C. voltage to reduce said voltage deviation signal; and, means for starting said comparing means and means for stepping said magnitude of said voltage deviation from a low value at an initial time to a maximum value at a final time, said duration between said initial time and said final time being less than about 20 seconds and occurring at the start of the operation of said comparing means.

50. An induction heating apparatus for ultra rapid annealing of a ferromagnetic strip moving at a selected velocity along a given path, said apparatus comprising:

a vacuum tube R.F. oscillator having a D.C. input power supply providing D.C. voltage and D.C. current to said oscillator, a grid, a radio frequency output, and a grid feedback circuit for driving said grid; an induction heating coil surrounding said strip, said coil having a known length along said path and a parallel capacitor bank forming said coil into a tank circuit with a resonant frequency; means for moving said strip into and through said coil at said selected velocity; means for sensing the voltage of said induction heating coil and means for adjusting said D.C. voltage of said input power supply in accordance with said sensed coil voltage to maintain the power density in said strip at a selected level as said strip passes through said coil to raise the temperature of said moving strip at a rate of at least about 500° F./sec to above the Curie point temperature; an isolation transformer adjacent said induction heating coil with a primary winding in parallel with said tank circuit of said coil and a secondary winding, means for energizing said grid feedback circuit by said secondary winding; said grid feedback circuit has a resonant frequency different from said resonant frequency of said tank circuit; means for creating a voltage set point, means for comparing said sensed coil voltage to said voltage set point and said adjusting means to create a voltage deviation signal including means for adjusting said D.C. voltage to reduce said voltage deviation signal; and, means for starting said comparing means and means for stepping said magnitude of said voltage deviation from a low value at an initial time to a maximum value at a final time, said duration between said initial time and said final time being less than about 20 seconds and occurring at the start of the operation of said comparing means.

51. An induction heating apparatus for ultra rapid annealing of a ferromagnetic strip having a thickness of 0.0045–0.0280 inches and moving at a selected velocity above 150 feet per minute along a given path, said apparatus comprising: a vacuum tube R.F. oscillator having a D.C. input power supply providing D.C. voltage and D.C. current to said oscillator, a grid, a radio frequency output and a grid feedback circuit for driving said grid; an induction heating coil surrounding said strip, said coil having a known length along said path and a parallel capacitor bank forming said coil into a tank circuit with a resonant frequency; means for moving said strip into and through said coil at said selected velocity; means for sensing the voltage of said induction heating coil; and, means for adjusting said D.C. voltage of said input power supply in accordance with said sensed coil voltage to maintain the voltage of said coil at a selected level as said strip passes through said coil.

52. An apparatus as defined in claim 51 including an isolation transformer adjacent said induction heating coil with a primary winding in parallel with said tank circuit for said coil and a secondary winding, means for energizing said grid feedback circuit by said secondary winding.

53. An apparatus as defined in claim 52 wherein said grid feedback circuit has a resonant frequency different from said resonant frequency of said tank circuit.

54. An apparatus as defined in claim 51 wherein said selected voltage is a voltage greater than 4400 volts.

55. An apparatus as defined in claim 51 wherein said selected voltage is a voltage in the range of 4800–5000 volts.

56. An apparatus as defined in claim 51 wherein said resonant frequency of said coil tank circuit is greater than 400 KHz.

57. An apparatus as defined in claim 51 wherein the power to said coil is at least about 600 Kw.

58. A method for ultra rapid annealing a ferromagnetic strip moving at a selected velocity along a given path, said method comprising the steps of:
(a) providing a vacuum tube R.F. oscillator having a D.C. input power supply providing D.C. voltage and D.C. current to said oscillator, a grid, a radio frequency output and a grid feedback circuit for driving said grid;
(b) providing an induction heating coil surrounding said strip, said coil having a known length along said path and a parallel capacitor bank forming said coil into a tank circuit with a resonant frequency;
(c) sensing the voltage of said induction heating coil;
(d) adjusting said D.C. voltage of said input power supply in accordance with said sensed coil voltage to maintain the power density in said strip at a selected level as said strip passes through said coil to raise the temperature of said moving strip at a rate of at least about 500° F./sec.

59. A method for ultra rapid annealing a ferromagnetic strip moving at a selected velocity along a given path, said method comprising the steps of:
(a) providing a vacuum tube R.F. oscillator having a D.C. input power supply providing D.C. voltage and D.C. current to said oscillator, a grid, a radio frequency output and a grid feedback circuit for driving said grid;
(b) providing an induction heating coil surrounding said strip, said coil having a known length along said path and a parallel capacitor bank forming said coil into a tank circuit with a resonant frequency;
(c) sensing the voltage of said induction heating coil;
(d) adjusting said D.C. voltage of said input power supply in accordance with said sensed coil voltage to maintain the power density in said strip at a selected level as said strip passes through said coil to raise the temperature of said moving strip at a rate of at least about 500° F./sec.
(e) sensing the D.C. input current;
(f) comparing said sensed D.C. input current with a current set point to create a first deviation signal;
(g) comparing the sensed coil voltage with a voltage set point to create a second deviation signal; and,
(h) controlling input power supply by the lesser of said deviation signals.

60. A method of ultra rapid annealing a ferromagnetic strip moving at a selected velocity along a given path, said method comprising the steps of:
(a) preheating said strip to a temperature in the general range of 600° F.–800° F.;
(b) inductively heating said preheated strip with a radio frequency, vacuum tube oscillator driving an induction heating coil surrounding said strip at an output voltage to create a power density to raise said strip 500° F./sec. as it moves through said coil;
(c) controlling said vacuum tube oscillator in a first mode by a signal responsive to the amount of deviation of the D.C. input current to said oscillator from a current set point until said strip passes through its Curie point temperature; and,
(d) then controlling said vacuum tube oscillator in a second mode by a signal responsive to the amount of deviation of the voltage across said coil from a voltage set point.

61. The method as defined in claim 60 including means for selecting said first or second modes of operation of said oscillator according to the relative amounts of deviation.

62. A method for ultra rapid annealing a textured steel strip with grain orientation having a thickness in the range of 0.0045-0.0280 inches moving at a selected velocity above about 150 fpm along a given path, said method comprising the steps of:
 (a) preheating said strip to a temperature exceeding 600° F.;
 (b) providing a vacuum tube R.F. oscillator having a D.C. input power supply providing D.C. voltage and D.C. current to said oscillator, a grid, a radio frequency output and a grid feedback circuit for driving said grid;
 (c) inductively heating said strip at a frequency of over 400 KHz and at a power greater than about 600 Kw with an induction heating coil having a known length along said path and a parallel capacitor bank forming said coil into a tank circuit with a resonant frequency matching said radio frequency output;
 (d) driving said coil with said oscillator;
 (e) sensing the voltage of said induction heating coil;
 (f) establishing a coil voltage value to create a power density in said strip as said strip passes through said coil to raise the temperature of said moving strip at a rate of at least about 500° F./sec;
 (g) comparing said sensed voltage to said voltage value to create a first deviation signal; and,
 (h) adjusting said D.C. voltage in accordance with said deviation signal.

63. A method for ultra rapid annealing a textured steel strip with grain orientation having a thickness in the range of 0.0045-0.0280 inches moving at a selected velocity above about 150 fpm along a given path, said method comprising the steps of:
 (a) preheating said strip to a temperature exceeding 600° F.;
 (b) providing a vacuum tube R.F. oscillator having a D.C. input power supply providing D.C. voltage and D.C. current to said oscillator, a grid, a radio frequency output and a grid feedback circuit for driving said grid;
 (c) inductively heating said strip at a frequency of over 400 HKz and at a power greater than about 600 Kw with an induction heating coil having a known length along said path and a parallel capacitor bank forming said coil into a tank circuit with a resonant frequency matching said radio frequency output;
 (d) driving said coil with said oscillator;
 (e) sensing the voltage of said induction heating coil;
 (f) establishing a coil voltage value to create a power density in said strip as said strip passes through said coil to raise the temperature of said moving strip at a rate of at least about 500° F./sec;
 (g) comparing said sensed voltage to said voltage value to create a first deviation signal;
 (h) adjusting said D.C. voltage in accordance with said deviation signal;
 (i) sensing the D.C. input current;
 (j) comparing said sensed D.C. input current with a current set point to create a second deviation signal; and,
 (k) controlling input power supply by the lesser of said deviation signals.

* * * * *